(12) United States Patent
Bhogal et al.

(10) Patent No.: US 7,197,699 B2
(45) Date of Patent: Mar. 27, 2007

(54) DYNAMIC SERVER PAGE ENGINES

(75) Inventors: Kulvir Singh Bhogal, Fort Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/139,269

(22) Filed: May 2, 2002

(65) Prior Publication Data

US 2003/0208530 A1 Nov. 6, 2003

(51) Int. Cl.
G06F 17/30 (2006.01)
(52) U.S. Cl. ............... 715/513; 715/526; 715/501.1; 709/203
(58) Field of Classification Search ............ 715/513, 715/500.1, 501.1, 514, 515
See application file for complete search history.

(56) References Cited

U.S. PATENT DOCUMENTS

| | | | |
|---|---|---|---|
| 5,794,046 A | 8/1998 | Meier et al. ............. | 395/704 |
| 6,067,565 A | 5/2000 | Horvitz ................... | 709/218 |
| 6,078,924 A | 6/2000 | Ainsbury et al. ........ | 707/101 |
| 6,085,226 A | 7/2000 | Horvitz ................... | 709/203 |
| 6,286,061 B1 | 9/2001 | Ross ....................... | 710/33 |
| 6,405,221 B1 * | 6/2002 | Levine et al. ........... | 715/501.1 |
| 6,799,718 B2 * | 10/2004 | Chan et al. .............. | 235/375 |
| 2002/0059327 A1 * | 5/2002 | Starkey ................... | 707/203 |
| 2003/0078960 A1 * | 4/2003 | Murren et al. ........... | 709/203 |
| 2005/0097008 A1 * | 5/2005 | Ehring et al. ............ | 705/26 |

FOREIGN PATENT DOCUMENTS

| | | |
|---|---|---|
| CA | 2317072 | 4/2001 |
| WO | WO 01/33422 A2 | 10/2001 |

OTHER PUBLICATIONS

SiteMesh Overview, [http://web.archive.org/web/20010605225429/http://www.opensymphony.com/sitemesh/], published on the Internet by OpenSymphony, crawled by Internet Archive on Jun. 5, 2001, pp. 1-3.*

(Continued)

Primary Examiner—Heather R. Herndon
Assistant Examiner—Gautam Sain
(74) Attorney, Agent, or Firm—John Biggers; Justin Dillon; Biggers & Ohanian, LLP (57) ABSTRACT

A method for operation of dynamic server page engines, including opening a first dynamic server page in a first dynamic server page engine comprising a dynamic server page meta-engine, writing, to an output of the dynamic server page meta-engine, the content of the first dynamic server page, and writing to a second dynamic server page the content to be rendered by a second dynamic server page engine. Embodiments also include rendering, in the second server page engine, the second dynamic server page, providing back to the dynamic server page meta-engine as output from the rendering the second dynamic server page as rendered, and writing the second dynamic server page as rendered to the output of the dynamic server page meta-engine.

24 Claims, 4 Drawing Sheets

OTHER PUBLICATIONS

Yuen, A.; "A Timy Pearl Server Pages Engine"; Dr. Dobb's Journal, vol. 26, No. 8, pp. 71, 73, 77-78, 80, 82, 84; Aug. 2001.

Pontelli, E., et al.; "Construction and Optimization of a Parallel Engine for Answer Set Programming"; Lecture Notes in Computer Science, University of Maryland; Nov. 2001.

Hariharan, R., et al.; "End to End Performance Modeling of Web Server Architectures"; Performance Evaluation Review; vol. 28, No. 2, pp. 57-63; Sep. 2000.

Angell, K.W.; "Python Server Pages: Part 1"; Dr. Dobb's Journal; vol. 25, No. 1, pp. 44-52; Jan. 2000.

* cited by examiner

DYNAMIC SERVER PAGE ENGINES

BACKGROUND OF THE INVENTION

1. Field of the Invention

The field of the invention is data processing, or, more specifically, methods, systems, and products for operation of dynamic server page engines.

2. Description of Related Art

Dynamic server pages comprise dynamic content. Dynamic content is, for example, in the case of the World Wide Web, web page content that includes the usual static content such as display text and markup tags, and, in addition, executable program content. Executable program content includes, for example, Java, VBScript, CGI gateway scripting, PHP script, and Perl code. The kind of executable program content found in any particular dynamic server page depends on the kind of dynamic server page engine that is intended to render the executable program content. For example, Java is typically used in Java Server Pages ("JSPs") for Java Server Page engines (sometime referred to in this disclosure as "JSP engines"); VBScript is used in Active Server Pages ("ASPs") for Microsoft Active Server Page engines (sometime referred to in this disclosure as "ASP engines"); and PHP script, a language based on C, C++, Perl, and Java, is used in PHP pages for PHP: Hypertext Preprocessor engines.

JSPs are often compiled into servlets, and servlets are written in Java. 'Servlets' are programs written in the Java programming language that run on a server, as opposed to a browser, where Java programs running in browsers are referred to as 'applets.' Detailed information about servlets can be found at http://java.sun.com/progucts/servlet. In fact, many JSP engines are in fact implemented as Java servlets. Detailed information about JSPs can be found at http://java.sun.com/products/jsp/. 'Java,' 'Java Server Pages,' and 'JSP' are trademarks of Sun Microsystems, Inc.

There are several kinds of dynamic server page engines, each of which typically is capable of rendering only one kind of dynamic server page, in each case, of course, it is the particular kind of dynamic server page for which the engine was developed in the first place. JSP engines render JSPs. ASP engines render ASPs. PHP engines render PHP pages. And so on. In some cases, however, the fact that engines only render a single kind of dynamic server page is a problem.

Consider, for example, the case of Java Server Page engines. With the arrival of Java and its related benefits, many companies that formerly ran, as dynamic server pages, Microsoft Active Server Pages ("ASPs") using VBScript are making a useful but difficult transition to Java Server Pages ("JSPs") using the Java language. This transition is often accomplished by programmers experienced in VBScript or Visual Basic but less experienced in Java. In current art, a transition to a Java platform requires use of separate server page engines which cannot run ASPs and JSPs simultaneously. A web server in current technology cannot distinguish ASPs and JSPs by inspecting file content because the markup tags in both types of dynamic server page are very similar.

In fact, in many cases the markup tags for the two types are identical, although existing program content is quite different. ASP engines will not execute or render correctly JSPs. It is cumbersome to make a large migration to JSPs and Java servlets from a totally ASP-based architecture. Alternatively, companies may use separate test servers or separate ports and careful alternate routing while making sure that no JSP program content exists on the same pages with ASP programming. For all these reasons, it would be advantageous to have a way to mix JSP and ASP dynamic content in the same dynamic server page. To do so, it would be useful to have a new kind of dynamic server page engine, an engine that could accept and somehow render, to a static output, inputs of any kind of dynamic content.

SUMMARY OF THE INVENTION

Embodiments of the present invention typically include methods for operation of dynamic server page engines. Exemplary embodiments typically include opening a first dynamic server page in a first dynamic server page engine, in which the first dynamic server page engine is a dynamic server page meta-engine. In such embodiments, the first dynamic server page typically includes content, the content includes at least one markup element, the markup element includes content to be rendered by a second dynamic server page engine, and the first dynamic server page has a file name having a file name extension identifying the first dynamic server page as a dynamic server page to be rendered by the dynamic server page meta-engine.

Embodiments typically include writing, to an output of the dynamic server page meta-engine, the content of the first dynamic server page, in which writing the content of the first dynamic server page includes writing, to a second dynamic server page, the content to be rendered by a second dynamic server page engine. Embodiments typically include rendering, in the second server page engine, the second dynamic server page, providing back to the dynamic server page meta-engine, as output from the rendering, the second dynamic server page as rendered, and writing to the output of the dynamic server page meta-engine, in-line with the content of the first dynamic server page, the second dynamic server page as rendered.

Exemplary embodiments of the invention typically include assigning to a second dynamic server page a file name having a file name extension identifying the second dynamic server page as a dynamic server page to be rendered by the second dynamic server page engine, creating a Uniform Resource Identifier or "URI." In typical embodiments, the URI includes a network address for a web server where the second dynamic server page engine is located, the file name, including the file name extension, of the second dynamic server page, and sending the URI to the web server in an HTTP request message.

In most embodiments, the markup element includes a tag and, optionally, one or more attributes. In exemplary embodiments, the tag typically includes a start tag and an end tag. In some embodiments, the second dynamic server page engine is a Microsoft Active Server Page engine. In other embodiments, the second dynamic server page engine is a Java Server Page engine.

In many embodiments, the content of the first dynamic server page typically includes a second markup element, in which the second markup element includes content to be rendered by a third dynamic server page engine. Exemplary embodiments typically include writing, to a third dynamic server page, the content to be rendered by a third dynamic server page engine, and rendering, in the third server page engine, the third server page, providing back to the dynamic server page meta-engine, as output from the rendering, the third dynamic server page as rendered. Such embodiments typically include writing, in-line with the content of the first dynamic server page, the third dynamic server page as rendered to the output of the dynamic server page meta-engine. In many such embodiments, the second dynamic server page engine is a Java Server Page engine and the third dynamic server page engine is a Microsoft Active Server Page engine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for operation of dynamic server page engines. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product are implemented by use of any recording medium for machine-readable information, including magnetic media, optical media, or other suitable media. Persons skilled in the art will immediately recognize that any computer system having suitable programming means is capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the terms "field," "data element," and "attribute," unless the context indicates otherwise, generally are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects." Aggregates of records are referred to as "tables" or "files." Aggregates of files are referred to as "databases."

"Browser" means a web browser, a software application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML and HDML.

A "data communications client" is any data communications software capable of performing network-based data communications, including email clients, browsers, and special purpose software systems. In typical embodiments of the present invention, data communications clients run on "data communications devices," which are any automated computing machinery capable of supporting data communications including web-enabled devices and handheld devices including telephones, web-enabled personal digital assistants, laptop computers, handheld radios, and communicators.

A "hyperlink," also referred to as "link" or "web link" is a reference to a resource name or network address which when invoked allows the named resource or network address to be accessed. Often the hyperlink identifies a network address at which is stored a web page. As used here, "hyperlink" is a broader term than "HTML anchor element." Hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data and server-side script output as well.

"PHP" is a recursive acronym for "PHP: Hypertext Preprocessor," an open-source server-side scripting language freely downloadable from php.net or zend.com. PHP is a scripting language for dynamic web pages, called PHP pages, rendered on PHP engines. PHP's scripting syntax is based on C, Perl, C++, and Java. PHP directly incorporates support for connectivity to most common databases, including Oracle, Sybase, MySQL, ODBC and others. PHP also supports integration with various external libraries, which allows developers to do anything from generating PDF documents to parsing XML. PHP is particularly associated with dynamic page development on Linux machines using Apache web servers, but runs also on any other UNIX or Windows platform, with Netscape or Microsoft Web server software. PHP also supports HTTP sessions, Java connectivity, regular expressions, LDAP, SNMP, IMAP, COM (under Windows) protocols.

We mention PHP in conjunction with Apache servers because Apache servers are so common on the web. Apache web servers are open source servers developed by the Apache HTTP Server Project, a project of the Apache Software Foundation, described in more detail at http://www.apache.org/.

"Resource" means any aggregation of information administered over networks by various embodiments of the present invention. Network communications protocols generally, for example, HTTP, transmit resources, not just files. A resource is an aggregation of information capable of being identified by a URI or URL. In fact, the 'R' in 'URI' is 'Resource.' The most common kind of resource is a file, but resources include dynamically-generated query results, the output of CGI scripts, dynamic server pages, documents available in several languages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources are currently either files or server-side script output. Server side script output includes output from CGI programs, Java servlets, Active Server Pages, Java Server Pages, and so on.

"CGI" means "Common Gateway Interface," a standard technology for data communications of resources between web servers and web clients. More specifically, CGI provides a standard interface between servers and server-side 'gateway' programs which administer actual reads and writes of data to and from files systems and databases. The CGI interface typically sends data to gateway programs through environment variables or as data to be read by the gateway programs through their standard inputs. Gateway programs typically return data through standard output. It is typically a gateway program that provides a MIME type in a return message header advising a server, and eventually therefore a browser or other communications client, of the type of data returned from CGI gateway programs.

"HTML" stands for 'HyperText Markup Language,' a standard markup language for displaying web pages on browsers.

"HTTP" stands for 'HyperText Transport Protocol,' the standard data communications protocol of the World Wide Web.

A "markup element" as the term is used in this disclosure refers to the content of a dynamic server page included within a tag, that is, included between a start tag and an end tag, including the start tag and the end tag. More particularly, for example, the following is an example of a markup element in which <JSP-Content> is a start tag, </JSP-Content> is an end tag, and the markup element is the entire example, including the start tag and end tag:
  <JSP-Content>
    Here is dynamic web content to
    Be rendered by a Java Server Page engine,
    Including text, markup, and Java code
  </JSP-Content>

"Network" is used in this specification to mean any networked coupling for data communications among computers or computer systems. Examples of networks useful with the invention include intranets, extranets, internets, local area networks, wide area networks, and other network arrangements as will occur to those of skill in the art.

"Server" in this specification refers to a computer or device comprising automated computing machinery on a network that manages network resources. A "Web server" in particular is a server that communicates with browsers by means of HTTP in order to manage and make available to networked computers markup language documents and digital objects.

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually the Internet. URLs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, for example to store or retrieve data, a URI often includes query parameters, or data to be stored, in the form of data encoded into the URI. Such parameters or data to be stored are referred to as 'URI encoded data.'

"URI encoded data" is data packaged in a URI for data communications. In the case of HTTP communications, the HTTP GET and POST functions are often used to transmit URI encoded data. In this context, it is useful to remember that URIs do more than merely request file transfers. URIs identify resource on servers. Such resource may be files having filenames, but the resources identified by URIs also include, for example, queries to databases. Results of such queries do not necessarily reside in files, but they are nevertheless data resources identified by URIs and identified by a search engine and query data that produce such resources. An example of URI encoded data is:

http://www.foo.com/cgi-bin/
      MyScript.cgi?field1=value1&field2=value2

This is an example of URI encoded data, which is how variable names and values typically are submitted over the web using HTTP GET request messages. This method using the GET message is useful when the amount of data to be encoded is fairly small. For larger amounts of data, it is more common to use HTTP POST messages for HTML form submissions.

More specifically, the entire example above is a URI bearing encoded data, and the encoded data is the string "field1=value1&field2=value2." The encoding method is to string field names and field values separated by '&' and "=" with spaces represented by '+.' There are no quote marks or spaces in the string. Having no quote marks, spaces are encoded with '+.' For example, if an HTML form has a field called "name" set to "Lucy", and a field called "neighbors" set to "Fred & Ethel", the data string encoding the form would be:

name=Lucy&neighbors=Fred+%26+Ethel

"URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." In this specification, we refer to such identifiers generally as URIs.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement a hyperlinking protocol, such as HTTP or WAP, in support of URIs and documents in markup languages, regardless whether such servers or groups of servers are coupled to the World Wide Web as such.

"WAP" stands for 'Wireless Application Protocol,' a proposed web-related data communications specification, or 'initiative,' directed toward wireless web enabled devices such as mobile phones, pagers, two-way radios, smartphones and communicators. WAP supports most wireless networks, including for example, CDPD, CDMA, GSM, PDC, PHS, TDMA, FLEX, ReFLEX, iDEN, TETRA, DECT, DataTAC, and Mobitex. WAP is supported by most operating systems, including those designed specifically engineered for wireless web enabled devices such as PalmOS, EPOC, Windows CE, FLEXOS, OS/9, and JavaOS. WAP implementations that use displays and access the Internet run microbrowsers, browsers with small file sizes that can accommodate low memory constraints of handheld devices and low-bandwidth constraints often associated with wireless networks. Although WAP supports HTML and XML, the WML language (an XML application) is specifically devised for small screens and one-hand navigation without a keyboard.

"WML" stands for 'Wireless Markup Language,' an XML language used as a markup language for web content intended for wireless web-enabled devices that implement WAP. There is a WAP forum that provides a DTD for WML. A DTD is an XML 'Document Type Definition.'

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modern browsers and other communications clients tend to support markup languages other than HTML, including, for example, XML.

DETAILED DESCRIPTION

Figure 1:
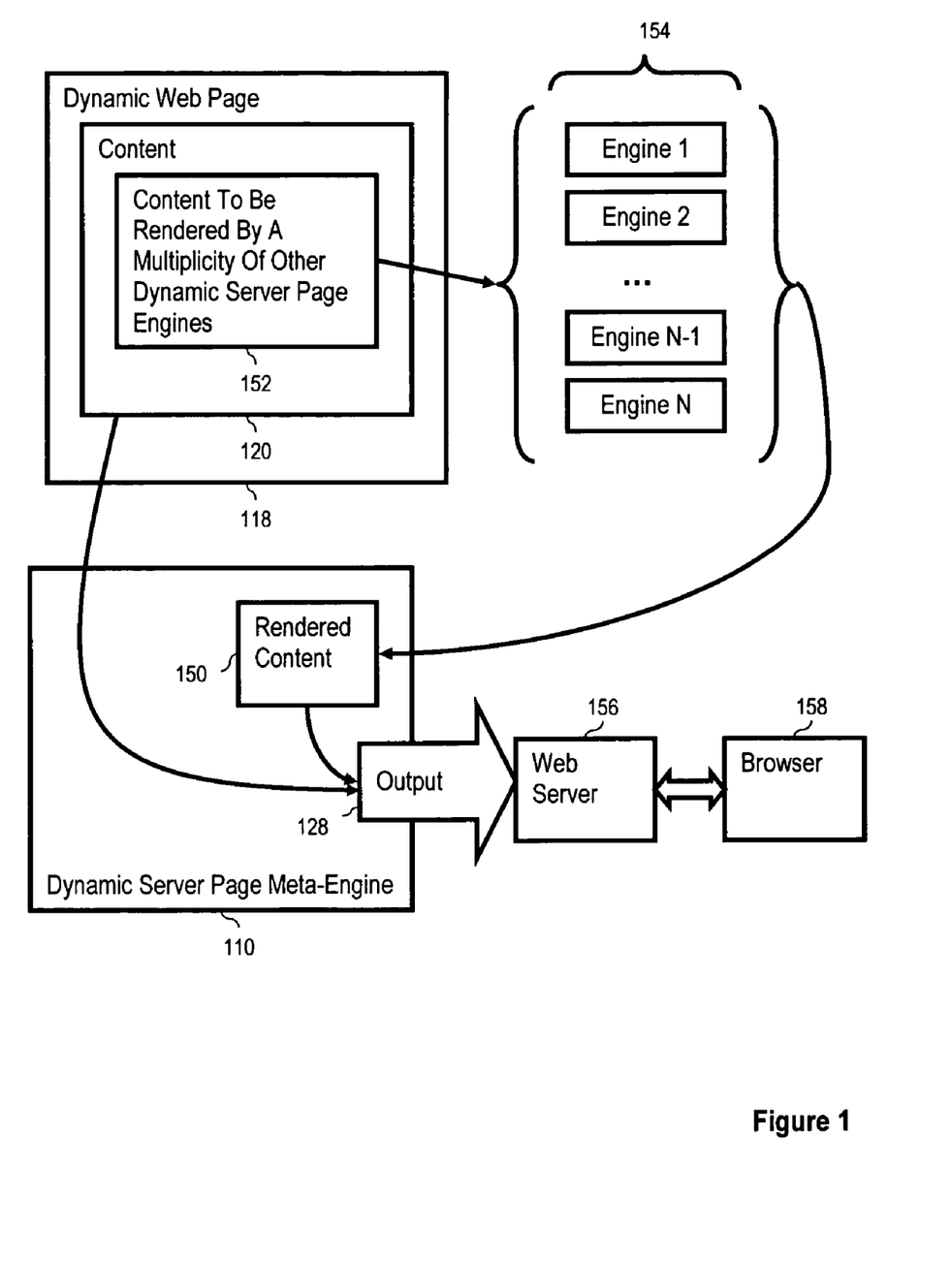
FIG. 1 is a general block diagram of an exemplary embodiment of the present invention.

FIG. 1 is a block diagram illustrating in a general way an embodiment of the present invention. The system of FIG. 1 shows a dynamic server page meta-engine capable of rendering into static web content, the dynamic content of a dynamic server page when the dynamic server page contains dynamic web content to be rendered by other engines. In this disclosure, for clarity, especially when speaking of several dynamic server pages and sometimes several different kinds of dynamic server pages, the kind of dynamic server page containing content to be rendered by engines other than a meta-engine is generally the 'first' dynamic server page under discussion, and such dynamic server pages are sometimes referred to as 'meta-dynamic server pages' or simply as 'meta-pages.'

In this disclosure, "dynamic server page engine" generally means any aggregation of computer software capable of accepting dynamic content as input and providing static content as output. This is perhaps a slightly broader definition than usual in the industry, because in terms of the present invention, gateway programs for operation in conjunction with Common Gateway Interfaces are perfectly useful with various embodiments of the invention, although perhaps not exactly what is traditionally understood as a dynamic server page engine. In this sense, a dynamic server page meta-engine in accordance with the present invention is a dynamic server page engine.

Dynamic content of dynamic server pages and ordinary static web content are distinguished. Ordinary HTML files typify static web content. Speaking generally and simply, ordinary HTML files can be viewed as containing only two things: text for display on data communications clients and markup for the text. Dynamic server pages, on the other hand, contain not only text and markup but also executable program content. Executable program content includes, for example, Java and VBScript. The kind of executable program content found in any particular dynamic server page depends on the kind of dynamic server page engine intended to render the executable program content. For example, Java in JSPs for JSP engines; VBScript in ASPs for ASP engines; and PHP script in PHP pages for PHP engines. Dynamic server page meta-engines implemented according to the present invention, however, typically can handle any kind of dynamic or executable program content.

More specifically, FIG. 1 shows a system that includes a dynamic server page meta-engine (110), a dynamic web page (118), and, in addition to the dynamic server page meta-engine, a number of other dynamic server page engines (154). The dynamic web page (118) includes, among its content (120), content to be rendered by dynamic server page engines (154) other than the dynamic server page meta-engine (152). The dynamic server page engines (154) other than the meta-engine include, include many kinds of engines for rendering dynamic content as will occur to those of skill in the art, including, for example, ASP engines, JSP engines, PHP engines, and so on.

In operation, such an embodiment channels web content (120) from the first dynamic web page to an output (128) and channels the content to be rendered by dynamic server page engines other than the dynamic server page meta-engine (152) to other dynamic web page engines to be rendered by them. The content (150) so rendered by other engines is returned to the dynamic server page meta-engine (110) and written into the output (128) in-line, and in correct sequence generally, with the web content (120) from the dynamic server page (118).

Embodiments of dynamic server page meta-engines according to FIG. 1 are typically invoked by URIs, including data-encoding URIs, issued from data communications clients, such as browsers (158), to data communications servers such as web servers (156). In addition to executable program content in dynamic web pages, it is also the use of data-encoding URIs that makes some web pages 'dynamic,' in that independent variables and their values encoded into data-encoding URIs vary the function of executable program content that depends upon the values of the variables.

Consider the example of a CGI script that queries a database and returns query results as static web content. The CGI script is invoked by a data-encoding URI comprising selection criteria for records in a database and the query results are one or more records that satisfy the selection criteria. The substance of the query results returned varies according to the values of the variables comprising selection criteria. The action of all executable program content varies similarly, that is, 'dynamically,' in dependence upon variable values encoded in data-encoding URIs used to invoke the executable program content.

It should now be clear that the engine referred to in this disclosure as "the dynamic server page meta-engine" is effectively a kind of super engine, the kind of thing we can correctly call a 'meta-engine' or a 'para-engine.' By this we mean that the first dynamic server engine as implemented in typical embodiments of the present invention is a dynamic server page engine that carries out its functions, at least partly, by invoking other dynamic server page engines. For this reason, generally in this disclosure, that first dynamic server page engine is referred to as a 'dynamic server page meta-engine.'

Figure 2:
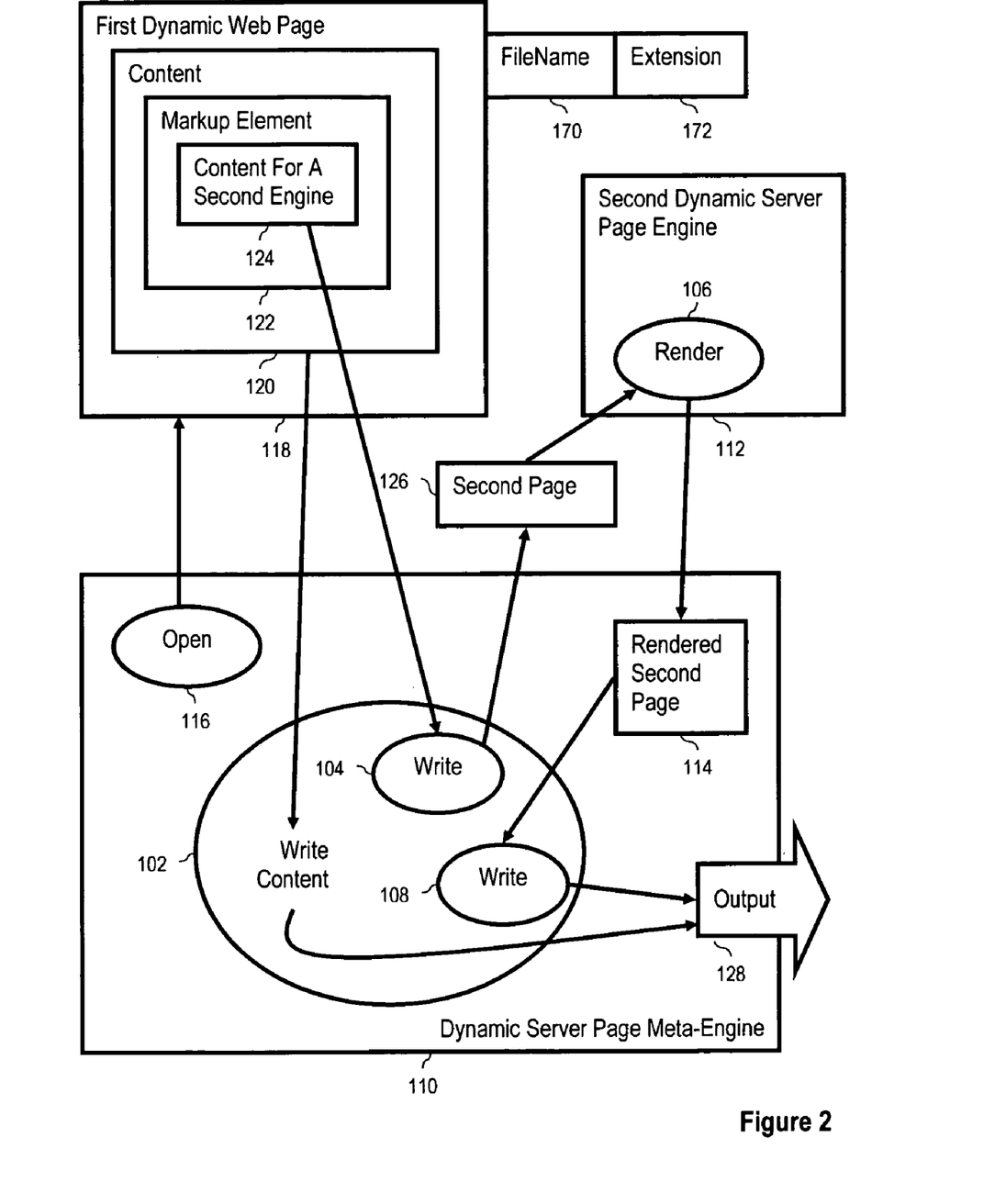
FIG. 2 is a data flow diagram of an exemplary embodiment of the present invention.

Turning to FIG. 2, a further embodiment of the invention is shown as a method for operation of dynamic server page engines. Embodiments according to FIG. 2 include opening (116) in a first dynamic server page engine (110) a first dynamic server page (118). In embodiments of the kind illustrated, the first dynamic server page engine is a dynamic server page meta-engine (110) according to the present invention.

In typical embodiments of this kind, the first dynamic server page comprises content (120), the content further comprising at least one markup element (122), the markup element comprising content to be rendered by a second dynamic server page engine (124). In embodiments of this kind, the first dynamic server page also typically comprises a file name (170) having a file name extension (172) identifying the first dynamic server page (118) as a dynamic server page to be rendered by the dynamic server page meta-engine (110).

Embodiments of the kind illustrated by FIG. 2 also typically include writing (102), to an output (128) of the dynamic server page meta-engine, the content (120) of the first dynamic server page. In such embodiments, writing the content of the first dynamic server page typically includes writing (104), to a second dynamic server page (126), the content (124) to be rendered by a second dynamic server page engine (112). Such embodiments typically include rendering (106), in the second server page engine (112), the second server page (126), providing back to the dynamic server page meta-engine, as output from the rendering, the second dynamic server page as rendered (114). Such embodiments typically also include writing (108), in-line with the content of the first dynamic server page (120), the second dynamic server page as rendered (114) to the output of the dynamic server page meta-engine (128).

In typical embodiments, the markup element (122) further comprises a tag and, optionally, one or more attributes. The tag often comprises a start tag and an end tag. More particularly, a start tag typically has the form <TagName>, and an end tag has the form </TagName>. Using such tags, dynamic web content in a dynamic server page, that is, a meta-page, has, for example, this format:

<JSP-Content>
      Here is dynamic web content to
      Be rendered by a Java Server Page engine,
      Including text, markup, and Java code
    </JSP-Content>

In this example, the entire content including the start tag <JSP-Content> and the end tag </JSP-Content> comprise a markup element in a dynamic server page. The markup element includes a tag and dynamic content identified by the tag as dynamic content to be rendered by a particular kind of dynamic server page engine, in this example, a Java Server Page engine.

Here is a larger example of meta-page content:
    <JSP-Content>
      Here is dynamic web content to
      Be rendered by a Java Server Page engine,
      Including text, markup, and Java code
    </JSP-Content>
    Here is static web content to
    Be rendered, written directly to output,
    By a dynamic server page meta-engine,
    Including text and markup, HTML, WML, XML, and so on
    <ASP-Content>
      Here is dynamic web content to
      Be rendered by an Active Server Page engine,
      Including text, markup, and VBScript
    </ASP-Content>

As described in more detail below, a dynamic server page meta-engine of the present invention, in rendering this example content, places the content between <JSP-Content> and </JSP-Content> in a file with a .jsp file name extension, calls a Java Server Page engine to render that content, and writes the content so rendered to the output of the meta-engine. Then the meta-engine writes the static content to its output. Then the meta-engine places the content between <ASP-Content> and </ASP-Content> in a file with an .asp file name extension, calls an Active Server Page engine to render that content, and writes the content so rendered to the output of the meta-engine. In this way, a meta-engine of the present invention renders dynamic server pages having any kind of dynamic content, all mixed together by programmers, changing content type arbitrarily at any time or place simply by inserting appropriate tags in a dynamic web page.

In some embodiments, the second dynamic server page engine (112) is a Microsoft Active Server Page engine. In other embodiments, the second dynamic server page engine (112) is a Java Server Page engine. In fact, it is clear after this explanation that the second dynamic server page is, in various embodiments, any dynamic server page engine whatsoever.

Figure 3:
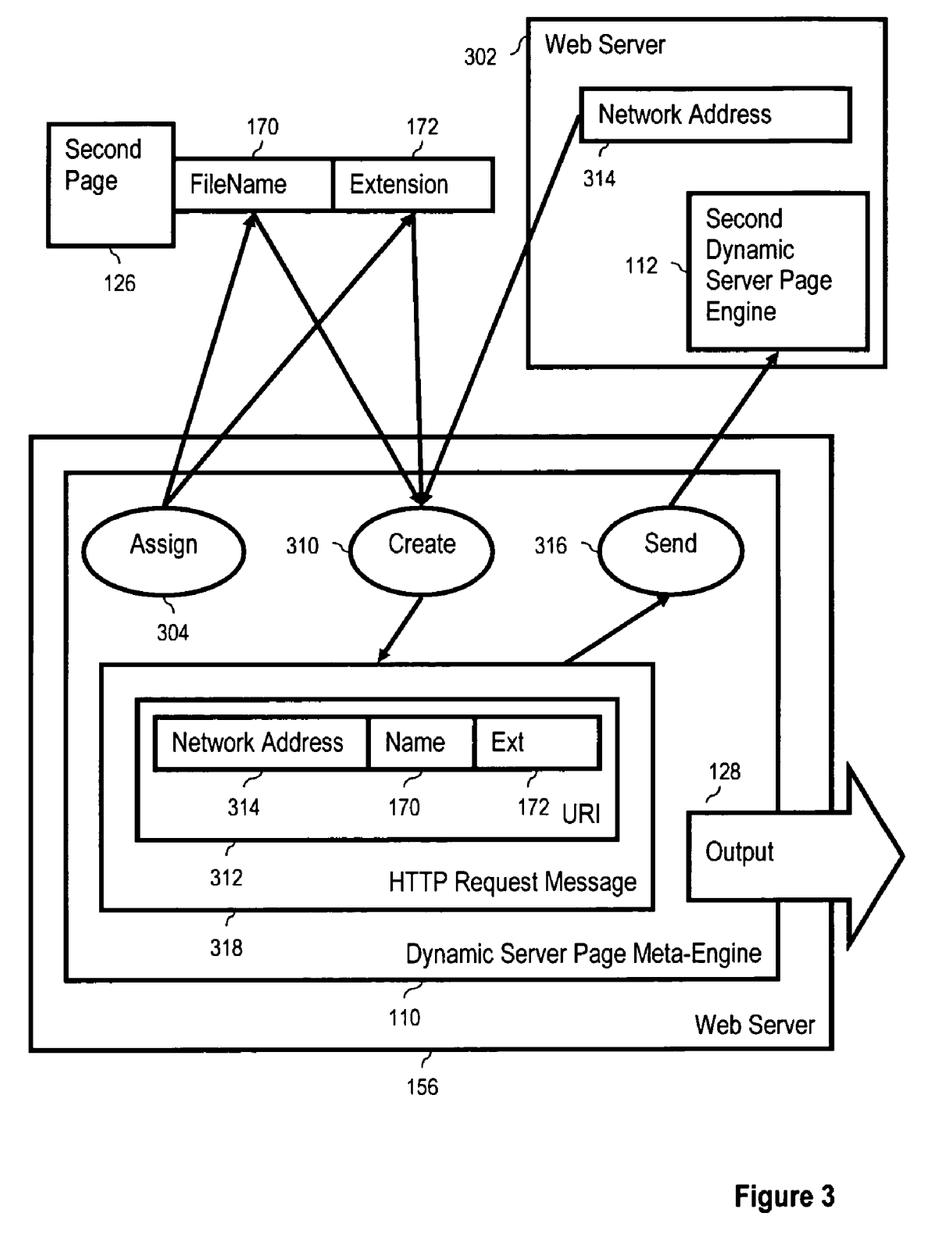
FIG. 3 is a data flow diagram of a further exemplary embodiment of the present invention.

Turning now to FIG. 3, a further embodiment of the invention is illustrated as including assigning (304) to the second dynamic server page (126) a file name (170) having a file name extension (172) identifying the second dynamic server page as a dynamic server page to be rendered by the second dynamic server page engine (112). That is, for example, if the second dynamic server page contains JSP program content, then the file name extension is typically "jsp," to identify the second dynamic server page as a Java Server Page to be rendered by a Java Server Page engine. If the second dynamic server page contains ASP program content, then the file name extension is typically "asp," to identify the second dynamic server page as an Active Server Page to be rendered by an Active Server Page engine. And so on. The file name in front of the extension can be anything, as long as it is known to the dynamic server page meta-engine so that is can be assigned to the second dynamic server page.

Embodiments of the kind shown in FIG. 3 typically include creating (310) a URI (312) comprising a network address (314) for a web server (302) where the second dynamic server page engine (112) is located and the file name (170), including the file name extension (172), of the second dynamic server page. Such embodiments typically include sending (316) the URI (312) to the web server (302) in an HTTP request message (318).

The network address (314) is typically either an IP address as such or a domain name that resolves to an IP address. That is, the network address has the form 123.53.54.001, for example, or it has the form "SomeWebServer.com," where SomeWebServer.com is a domain name that is resolved by a Domain Name Service ("DNS") into an IP address having the first form. Either form of network address is useful in URIs of the present invention.

If, for example, a web server (302) has the domain name "AWebServer.com," and the file name and extension of the second dynamic server page add up to "A-JSP-Page.jsp," then a URI comprising these elements is created in this exemplary form:

http://www.AWebServer.com/A-JSP-Page.jsp

That is a basic example. It is very common, however, that the second dynamic server page needs variable values to implement its dynamism, and in such cases, the URI has a form more like this:

http://www.AWebServer.com/A-JSP-
        Page.jsp?field1=value1&field2=value2 where value1 and value2 are variable values for the variables named field1 and field2 respectively. Such variable values are, for example, taken by the meta-engine from a data-encoding URI that called the meta-engine to render the first dynamic server page, in effect, passing the variables and their values through to other dynamic server page engines as needed. Persons of skill in the art will think of other ways to pass variables from a meta-engine to other dynamic server page engines, and all such ways are well within the scope of the present invention.

Further regarding creation of URIs, let us return to our earlier larger example of dynamic web content in a meta-page:

<JSP-Content>
  Here is dynamic web content to
  Be rendered by a Java Server Page engine,
  Including text, markup, and Java code
</JSP-Content>
Here is static web content to
Be rendered, written directly to output,
By a dynamic server page meta-engine,
Including text and markup, HTML, WML, XML, and so on
<ASP-Content>
  Here is dynamic web content to
  Be rendered by an Active Server Page engine,
  Including text, markup, and VBScript
</ASP-Content>

As mentioned above, a dynamic server page meta-engine of the present invention, in rendering this example content, places the dynamic content in a files with appropriate name extensions, calls dynamic server page engines to render that dynamic content, and writes the content so rendered to the output of the meta-engine. Now we see in more detail how this typically is done.

Typically, a meta-engine includes in computer memory a data structure associating tags with file name extensions and web server addresses of servers where particular dynamic server page engines are located. Here is an example of such a data structure:

| Tag | Extension | Address |
|---|---|---|
| JSP-Content | jsp | AWebServer.com |
| ASP-Content | asp | AnotherWebServer.com |
| PHP-Content | php | StillAnotherServer.com |
| CGI-Content | cgi | AFurtherServer.com |

A meta-engine of the present invention, having in its computer memory the associations exemplified in the structure just above, upon encountering in a dynamic web page a tag <JSP-Content>, places the dynamic content so tagged in a second dynamic web page having any file name but having the files name extension 'jsp,' creates a URI in this form:

http://www.AWebServer.com/anyfilename.jsp, sends the URI to the web server AWebServer.com in an HTTP request message, and writes returned rendered content to its output. Similarly, such a meta-engine, upon encountering in a dynamic web page a tag <ASP-Content>, places the dynamic content so tagged in another dynamic web page having any file name but having the files name extension 'asp,' creates a URI in this form:

http://www.AnotherWebServer.com/anyfilename.asp, sends the URI to the web server AnotherWebServer.com in an HTTP request message, and writes returned rendered content to its output.

Similarly, such a meta-engine, upon encountering in a dynamic web page a tag <PHP-Content>, places the dynamic content so tagged in another dynamic web page having any file name but having the file name extension 'php,' creates a URI in this form:

http://www.StillAnotherServer.com/anyfilename.php, sends the URI to the web server StillAnotherServer.com in an HTTP request message, and writes returned rendered content to its output. Similarly, such a meta-engine, upon encountering in a dynamic web page a tag <CGI-Content>, places the dynamic content so tagged in another dynamic web page having any file name but having the files name extension 'cgi,' creates a URI in this form:

http://www.AFurtherServer.com/anyfilename.cgi, sends the URI to the web server AFurtherWebServer.com in an HTTP request message, and writes returned rendered content to its output.

Meta-Page Content Includes Dynamic Content for Rendering by More Than One Dynamic Server Page Engine Other Than a Meta-Engine As mentioned above, the web content (120) in dynamic web pages of the present invention (118) typically include at least one markup element comprising content to rendered by a dynamic server page engine other than the dynamic server page meta-engine. Although it is not a required element of the invention, as a practical matter, many, if not most, embodiments of dynamic web pages according to the present invention contain more than one markup element comprising content to be rendered by dynamic server engines other than the dynamic server page meta-engine. We illustrate this point more closely by reference to FIG. 4.

Figure 4:
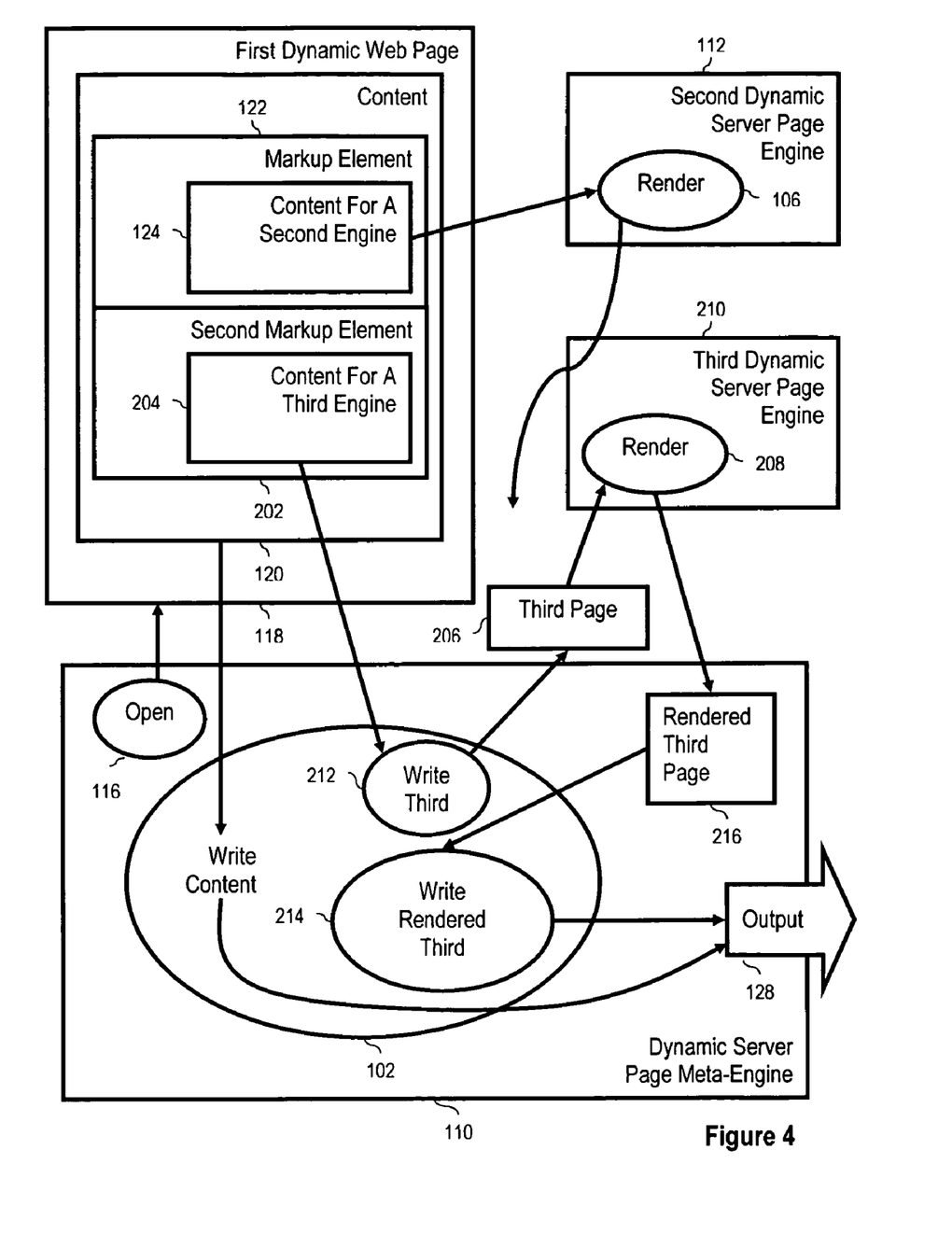
FIG. 4 is a data flow diagram of a still further exemplary embodiment of the present invention.

Turning now to FIG. 4, a further embodiment of the invention is illustrated in which the content (120) of a first dynamic server page (118) includes, in addition to a first markup element (122), a second markup element (202). The second markup element in the illustrated embodiment comprises content (204) to be rendered by a third dynamic server page engine (210).

Embodiments according to FIG. 4 include writing (212), to a third dynamic server page (206), the content (204) to be rendered by a third dynamic server page engine. Such embodiments include rendering (208), in the third server page engine (210), the third server page (206), providing back to the dynamic server page meta-engine, as output from the rendering, the third dynamic server page as rendered (216). Such embodiments include writing (214), in-line with the content of the first dynamic server page (120), the third dynamic server page as rendered (216) to the output of the dynamic server page meta-engine (128).

In some embodiments according to FIG. 4, the second dynamic server page engine (112) is a Java Server Page engine and the third dynamic server page engine (210) is a Microsoft Active Server Page engine. Although this particular example discusses only two dynamic server page engines in addition to the meta-engine, it is clear by now in our discussion that such embodiments include content to be rendered by any number of dynamic server page engines other than the dynamic server page meta-engine. It is clear also that dynamic server page engines useful with various embodiments of the present invention include any aggregation of computer software and hardware capable of accepting dynamic web content as an input and rendering to an output, in dependence upon the dynamic web content, static web content. Such engines include Java Server Page engines, Microsoft Active Server Page engines, Perl Server Page Engines, CGI gateway programs, and others as will occur to those of skill in the art.

Meta-Pages with Filename Extensions Identified with Other Engines

As mentioned above, embodiments of the kind shown in FIG. 3 typically include creating (310) a URI (312) comprising a network address (314) for a web server (302) where the second dynamic server page engine (112) is located and the file name (170), including the file name extension (172), of the second dynamic server page. Such embodiments typically include sending (316) the URI (312) to the web server (302) in an HTTP request message (318). In such embodiments, it is common for the process (shown at references 124, 104, and 126 on FIG. 2) of writing content for a second engine to a second dynamic server page to include writing such content to the second dynamic server page on the web server (302) where the second dynamic server page is located, or on the same computer as the web server where the second dynamic server page is located. FIG. 3 shows the meta-engine (110) as comprised within the web server (156) to illustrate the usefulness of separating the engines onto separate servers, in many embodiments, although such separation is not a necessary requirement of the invention.

More particularly, FIG. 3 shows the meta-engine (110) as comprised within the web server (156) to illustrate the fact that there is no requirement within the present invention for the use of any particular file name extension for URIs that invoke the meta-engine. That is, dynamic web pages containing content for a second engine have any file name extension known to a web server upon which the meta-engine is installed as intended to be rendered by the meta-engine. Such filename extensions often are '.msp,' implying 'meta-server pages,' but any filename extension can be used to invoke a meta-engine as long as a web server of the meta-engine associates the filename extension with the meta-engine.

Even more particularly, in many embodiments, filename extensions invoking meta-engines are implemented as '.jsp' or '.asp,' the traditional filename extensions for Java Server Pages and Active Server Pages. This is a surprising and useful characteristic of many embodiments of the present invention. Consider the following example:

A company wishes to migrate many Active Server Pages to Java Server Pages. Many programmers are is hired to aid the transition. The Active Server Pages contain many lines of VBScript. Even more important, URIs invoking the Active Server Pages are located in thousands of web pages and bookmark listings all over the world. If the programmers change the filename extensions to '.msp' in preparation for converting the Active Server Pages to meta-pages to be rendered by a meta-engine, then all those thousands of references to the Active Server Pages will be instantly rendered useless. There are workarounds for that, but they are awkward. In embodiments of the present invention, however, the solution is elegant.

The programmers simply open the Active Server Pages, insert tags identifying content to be administered by Active Server Page engines, insert tags identifying new Java code to be entered by the programmers, and then identify to a server, upon which is installed a meta-engine, that URIs calling dynamic server pages with filename extensions of '.jsp' are to be rendered by the meta-engine, not by an Active Server Page engine. In this example solution, none of the filenames or filename extensions of the Active Server Pages are altered at all, thus leaving all the thousands of URIs all over the world referring to them completely valid and continuously useful, despite the fact that those Active Server Pages are no longer simply Active Server Pages, containing now as they do Java code, making those former Active Server Pages into dynamic server pages that can no longer be rendered by either an Active Server Page engine or a Java Server Page engine. Now those former Active Server Pages are pages of the present invention, dynamic server pages that require a meta-engine for rendering.

Readers now will have noticed that there are two kinds of dynamic server pages under administration in this example, both of which have filename extensions of '.asp.' The former Active Server Pages, now in effect 'meta-pages,' still have '.asp' filename extensions, and the second dynamic server pages (126) to which is written the content to be rendered by an Active Server Page engine also have, in many embodiments, filename extensions of '.asp.'

The apparent risk of confusion is handled by the fact that the second dynamic server page engine (112) responsible for rendering the second dynamic server pages having filename extensions of '.asp,' as mentioned above, resides on a web server (302) other than the web server (156) on which the meta-engine (110) is installed. Thus the network address (314) resolved for URIs invoking the second dynamic server page (126) is different from the network address resolved by URIs comprising filename extensions invoking the meta-engine. This is one way of administering the apparent risk of confusion. Other ways will occur to those of skill in the art, and all such ways are well within the scope of the present invention.

In addition to the benefit of leaving many, many referring URIs intact and useful by not changing the filename extension of former Active Server Pages, there is an additional benefit that should be clear at this point. That additional benefit is the extreme simplicity of transitioning to Java through embodiments of the present invention. In this example, all the programmer had to do was simply open existing dynamic server pages in a text editor, mark the existing content with tags, mark off a new content area with tags indicating content for a Java Server Page engine, and start typing in Java code. In particular, there is no need in this example for the programmer or the company experiencing the transition to Java Server Pages to convert an entire system, or even an entire page, of Active Server Pages to Java before beginning active use of Java. Instead, the programmer and the company are enabled to move in the direction of a new technology one sensible step at a time. This is a very fine benefit of the present invention.

Meta-Engines Built from Other Engines

Now we direct the reader's attention again to our earlier larger example of dynamic web content in a meta-page:
 <JSP-Content>
   Here is dynamic web content to
   Be rendered by a Java Server Page engine,
   Including text, markup, and Java code
 </JSP-Content>
 Here is static web content to
 Be rendered, written directly to output,
 By a dynamic server page meta-engine,
 Including text and markup, HTML, WML, XML, and so on
 <ASP-Content>
   Here is dynamic web content to
   Be rendered by an Active Server Page engine,
   Including text, markup, and VBScript
 </ASP-Content>

Remember that in this example, the content to be rendered directly by the meta-engine is static markup content such as HTML, WML, XML and the like. It is useful in some kinds of embodiments of the present invention, however, to have the capability of rendering dynamic content directly through a meta-engine. A meta-engine capable of directly rendering dynamic content is in some embodiments, for example, a modified dynamic server page engine, such as, for example, a modified JSP engine. Because a JSP engine already has the capability of directly rendering dynamic Java content as well as static markup and text, a meta-engine of the present invention implemented by adding the capabilities of embodiments of the present invention to a JSP engine, for example, has the capability also of rendering, by invoking other engines, dynamic content to be rendered by other engines as well as directly rendering static content and dynamic JSP content.

In describing building a meta-engine by modifying another dynamic server page engine, we discuss a JSP engine merely as one example of another dynamic server page engine to be modified. Readers understand that any dynamic server page engine can be so modified, and all such modifications of dynamic server page engines to implement meta-engines are well within the scope of the present invention.

For such a meta-engine, our larger example of dynamic content useful in such embodiments is modified as follows:
 <ContentForASecondEngine>
   Here is dynamic web content to
   Be rendered by an engine other than the meta-engine,
   such as, for example, an ASP engine, a Perl engine,
   CGI Gateway scripts, and so on.
 </ContentForASecondEngine>
 Here is static content and dynamic web content to
 Be rendered by a Java Server Page engine, including
 text, markup, and Java code, in this example, including all
 static content and all Java dynamic content in the meta-page
 between the two example entries, just above and just below,
 of tags for content to be rendered by other engines
 <ContentForAThirdEngine>
   Here is dynamic web content to
   Be rendered by an engine other than the meta-engine,
   such as, for example, an ASP engine, a Perl engine,
   CGI Gateway scripts, and so on.
 </ContentForAThirdEngine>

More particularly, for the case of ASP, JSP, and static content only, for such a meta-engine, our larger example of dynamic content useful in such embodiments is modified as follows:
 <ASP-Content>
   Here is static and dynamic web content to
   Be rendered by an Active Server Page engine,
   Including text, markup, and VBScript
 </ASP-Content>
 Here is static content and dynamic web content to
 Be rendered by a directly by the meta-engine, including
 text, markup, and Java code, in this example, including all
 static content and all Java dynamic content in the meta-page
 between the two example entries, just above and just below,
 of tags for content to be rendered by another engine
 <ASP-Content>
   Here is more static and dynamic web content to
   Be rendered by an Active Server Page engine,
   Including text, markup, and VBScript
 </ASP-Content>

In such embodiments, just as in the embodiments described earlier, the meta-engine still writes to the output of the dynamic server page meta-engine, in-line with the content of the first dynamic server page, here called a meta-page, the second dynamic server page as rendered, in this case, rendered by an ASP engine. In this class of embodiment, however, the 'content of the first dynamic server page' includes not only static content but also dynamic Java content rendered by the meta-engine as well.

Implementation of such a meta-engine includes editing the source code of a JSP engine to include the functionality of at least one embodiment of the present invention, content tags for other engines, writing to secondary files content tagged for other engines, invoking the other engines, and so on. The benefits of such embodiments include ease of use in transitions to Java Server Pages.

More particularly, consider our earlier example of programmers hired to convert ASPs to JSPs. In that example, the programmers using the kind of embodiment described were required to tag all dynamic content including the Java dynamic content for rendering by engines other than the meta-engine. Programmers using this class of embodiments, embodiments in which the meta-engine is built on a JSP engine foundation, however, are not required to tag pre-existing static content or new Java-oriented dynamic content.

That is, programmers using this class of embodiments, in converting ASPs, for example, to meta-pages, need only open the ASPs in their editors, tag off the dynamic content to be rendered by ASP engines, and then start programming, entering both additional static content as well as new Java-oriented dynamic content which would in other embodiments need to be rendered by a separate JSP engine but in this class of embodiments is rendered directly by the meta-engine. Filename extensions of '.asp' are left as they are, and the filename extension '.asp' is identified to a web server for the meta-engine as referring to the meta-engine, as described in more detail above, thus preserving the usefulness of many URIs probably already pointing to the ASPs under conversion. Although we discuss this particular example in terms of ASPs and JSPs, in fact, any such transition among categories of dynamic content is well within the scope of the present invention. And any such transition is greatly eased by use of various embodiments of the present invention in programming environments for dynamic server pages.

It is clear from the wide range of exemplary embodiments described that there are many, many embodiments within the scope of the present invention. It will be understood from the foregoing description that various modifications and changes may be made in the exemplary embodiments of the present invention without departing from the true spirit of the present invention. The descriptions in this specification are for purposes of illustration only and are not to be construed in a limiting sense. The scope of the present invention is limited only by the language of the following claims.

What is claimed is:

1. A method far operation of dynamic server page engines, the method comprising the steps of:
   opening a first dynamic server page in a first dynamic server page engine, wherein:
      the first dynamic server page engine is a dynamic server page meta-engine, and
      the first dynamic server page comprises content, the content further comprising at least one markup element the markup element comprising content to be rendered by a second dynamic server page engine, and
      the first dynamic server page has a file name having a file name extension identifying the first dynamic server page as a dynamic server page to be rendered by the dynamic server page meta-engine;
   writing, to an output of the dynamic server page meta-engine, the content of the first dynamic server page, wherein writing the content of the first dynamic server page further comprises writing, to a second dynamic server page, the content to be rendered by a second dynamic server page engine;
   rendering, in the second server page engine, the second dynamic server page, providing back to the dynamic server page meta-engine, as output from the rendering, the second dynamic server page as rendered;
   writing to the output of the dynamic server page meta-engine, in-line with the content of the first dynamic server page, the second dynamic server page as rendered.

2. The method of claim 1 further comprising:
   assigning to the second dynamic server page a file name having a file name extension identifying the second dynamic server page as a dynamic server page to be rendered by the second dynamic server page engine,
   creating a URI comprising
      a network address for a web server where the second dynamic server page engine is located and
      the file name, including the file name extension, of the second dynamic server page; and
   sending the URI to the web server in an HTTP request message.

3. The method of claim 1 wherein the markup element further comprises a tag and, optionally, one or more attributes.

4. The method of claim 2 wherein the tag comprises a start tag and an end tag.

5. The method of claim 1 wherein the second dynamic server page engine is a Microsoft Active Server Page engine.

6. The method of claim 1 wherein the second dynamic server page engine is a Java Sever Page engine.

7. The method of claim 1 wherein the content of the first dynamic server page further comprises a second markup element, the second markup element comprising content to be rendered by a third dynamic server page engine, the method further comprising:
   writing, to a third dynamic server page, the content to be rendered by a third dynamic server page engine;
   rendering, in the third server page engine, the third server page, providing back to the dynamic server page meta-engine, as output from the rendering, the third dynamic server page as rendered;
   writing, in-line with the content of the first dynamic server page, the third dynamic server page as rendered to the output of the dynamic server page meta-engine.

8. The method of claim 7 wherein the second dynamic server page engine is a Java Server Page engine and the third dynamic server page engine is a Microsoft Active Server Page engine.

9. A system for operation of dynamic server page engines, the system comprising:
   a computer processor;
   a computer memory operatively coupled to the computer processor, the computer memory having disposed within it:
   means for opening a first dynamic server page in a first dynamic server page engine, wherein:
      the first dynamic server page engine is a dynamic server page meta-engine, and
      the first dynamic server page comprises content, the content further comprising at least one markup element, the markup element comprising content to be rendered by a second dynamic server page engine, and
      the first dynamic server page has a file name having a file name extension identifying the first dynamic server page as a dynamic server page to be rendered by the dynamic server page meta-engine;
   means for writing, to an output of the dynamic server page meta-engine, the content of the first dynamic server page, wherein means for writing the content of the first dynamic server page further comprises means for writing, to a second dynamic server page, the content to be rendered by a second dynamic server page engine;
   means for rendering, in the second server page engine, the second dynamic server page, providing back to the dynamic server page meta-engine, as output from the rendering, the second dynamic server page as rendered;
   means for writing to the output of the dynamic server page meta-engine, in-line with the content of the first dynamic server page, the second dynamic server page as rendered.

10. The system of claim 9 further comprising:
   means for assigning to the second dynamic server page a file name having a file name extension identifying the second dynamic server page as a dynamic server page to be rendered by the second dynamic server page engine,
   means for creating a URI comprising
      a network address for a web server where the second dynamic server page engine is located and
      the file name, including the file name extension, of the second dynamic server page; and
   means for sending the URI to the web server in an HTTP request message.

11. The system of claim 9 wherein the markup element further comprises a tag and, optionally, one or more attributes.

12. The system of claim 10 wherein the tag comprises a start tag and an end tag.

13. The system of claim 9 wherein the second dynamic server page engine is a Microsoft Active Server Page engine.

14. The system of claim 9 wherein the second dynamic server page engine is a Java Server Page engine.

15. The system of claim 9 wherein the content of the first dynamic server page further comprises a second markup element, the second markup element comprising content to be rendered by a third dynamic server page engine, the system further comprising:
   means for writing, to a third dynamic server page, the content to be rendered by a third dynamic server page engine;
   means for rendering, in the third server page engine, the third server page, providing back to the dynamic server page meta-engine, as output from the rendering, the third dynamic server page as rendered;
   means for writing, in-line with the content of the first dynamic server page, the third dynamic sever page as rendered to the output of the dynamic server page meta-engine.

16. The system of claim 15 wherein the second dynamic server page engine is a Java Server Page engine and the third dynamic server page engine is a Microsoft Active Server Page engine.

17. A computer program product for operation of dynamic server page engines, the computer program product comprising:
   a recording medium;
   means, recorded on the recording medium, for opening a first dynamic server page in a first dynamic server page engine, wherein;
      the first dynamic server page engine is a dynamic server page meta-engine, and
      the first dynamic server page comprises content, the content further comprising at least one markup element, die markup element comprising content to be rendered by a second dynamic server page engine, and
      the first dynamic server page has a file name having a file name extension identifying the first dynamic server page as a dynamic server page to be rendered by the dynamic server page meta-engine;
   means, recorded on the recording medium, for writing, to an output of the dynamic server page meta-engine, the content of the first dynamic server page, wherein means, recorded on the recording medium, for writing the content of the first dynamic server page further comprises means, recorded on the recording medium, for writing, to a second dynamic server page, the content to be rendered by a second dynamic server page engine;
   means, recorded on the recording medium, for rendering, in the second server page engine, the second dynamic server page, providing bank to the dynamic server page meta-engine, as output from the rendering, the second dynamic server page as rendered;
   means, recorded on the recording medium, for writing to the output of the dynamic server page meta-engine, in-line with the content of the first dynamic server page, the second dynamic server page as rendered.

18. The computer program product of claim 17 further comprising:
   means, recorded on the recording medium, for assigning to the second dynamic server page a file name having a file name extension identifying the second dynamic server page as a dynamic server page to be rendered by the second dynamic server page engine,
   means, recorded on the recording medium, for creating a URI comprising
      a network address for a web server where the second dynamic server page engine is located and
      the file name, including the file name extension, of the second dynamic server page; and
   means, recorded on the recording medium, for sending the URI to the web server in an HTTP request message.

19. The computer program product of claim 17 wherein the markup element further comprises a tag and optionally, one or more attributes.

20. The computer program product of claim 18 wherein the tag comprises a start tag and an end tag.

21. The computer program product of claim 17 wherein the second dynamic server page engine is a Microsoft Active Server Page engine.

22. The computer program product of claim 17 wherein the second dynamic server page engine is a Java Server Page engine.

23. The computer program product of claim 17 wherein the content of the first dynamic server page further comprises a second markup element, the second markup element comprising content to be rendered by a third dynamic server page engine, the computer program product further comprising:
   means, recorded on the recording medium, for writing, to a third dynamic server page, the content to be rendered by a third dynamic server page engine;
   means, recorded on the recording medium, for rendering, in the third server page engine, the third server page, providing back to the dynamic sever page meta-engine, as output from the rendering, the third dynamic server page as rendered;
   means, recorded on the recording medium, for writing, in-line with the content of the first dynamic server page, the third dynamic server page as rendered to the output of the dynamic server page meta-engine.

24. The computer program product of claim 23 wherein the second dynamic server page engine is a Java Server Page engine and the third dynamic server page engine is a Microsoft Active Server Page engine.

* * * * *